United States Patent
Bürgel et al.

(10) Patent No.: US 6,815,517 B2
(45) Date of Patent: Nov. 9, 2004

(54) MORTAR COMPOSITION OF AT LEAST TWO COMPONENTS AND CURABLE BY HEAT INITIATION AND A METHOD FOR FASTENING TIE RODS, REINFORCING STEEL FOR CONCRETE OR THE LIKE IN SOLID SUBSTRATES

(75) Inventors: Thomas Bürgel, Landsberg am Lech (DE); Marianne Böck, Waal (DE)

(73) Assignee: Hilti Aktiengesellschaft, Schaan (LI)

( * ) Notice: Subject to any disclaimer, the term of this patent is extended or adjusted under 35 U.S.C. 154(b) by 146 days.

(21) Appl. No.: 10/188,203

(22) Filed: Jul. 1, 2002

(65) Prior Publication Data

US 2003/0027900 A1 Feb. 6, 2003

(30) Foreign Application Priority Data

Jul. 4, 2001 (DE) .......................... 101 32 336

(51) Int. Cl.$^7$ ................................ C08F 4/40
(52) U.S. Cl. ................ 526/319; 526/319; 526/326; 526/329.7; 526/334; 526/91; 526/229; 526/217; 520/430
(58) Field of Search ................. 526/319, 326, 526/329.7, 334, 341, 91, 229, 217; 520/430

(56) References Cited

U.S. PATENT DOCUMENTS

| | | | |
|---|---|---|---|
| 4,326,049 A | * 4/1982 | Rasmussen | 526/91 |
| 4,944,819 A | * 7/1990 | Gebauer | 156/78 |
| 5,531,546 A | 7/1996 | Herdlicka et al. | |
| 6,037,408 A | 3/2000 | Weber et al. | |
| 6,057,406 A | 5/2000 | Pojman et al. | |

FOREIGN PATENT DOCUMENTS

| | | |
|---|---|---|
| DE | 0002367 | 7/2001 |
| EP | 0081972 | 6/1983 |

OTHER PUBLICATIONS

Rasmussen et al., Makromol. Chem., 1981, vol. 182, pp. 701–703.*
Ghosh et al., European Polymer Journal, 1978, vol. 14, pp. 855–859.*
Abstract of South Korean Patent No. 9,600 046, Jan., 1996.

* cited by examiner

Primary Examiner—Tatyana Zalukaeva
Assistant Examiner—Satya B Sastri
(74) Attorney, Agent, or Firm—Sidley Austin Brown & Wood, LLP

(57) ABSTRACT

An at least two-component mortar composition is described, which can be cured by thermal initiation and contains at least one polymerizable monomer and/or at least one curable resin, at least one polymerization initiator for the polymerizable monomer and/or the curable resin and optionally at least one filler, wherein, as polymerization initiator, at least one organically substituted ammonium salt is contained as constituent of a mortar component and at least one inorganic persulfate is contained as constituent of a further mortar component, and which, after the mortar components are mixed in situ, results in an organically substituted ammonium persulfate, the nature and amount of organically substituted ammonium salt and inorganic persulfate as well as of polymerizable monomer or curable resin being selected so that a mortar composition results, which can be polymerized by free radical polymerization due to the action of heat, as well as a method for fastening tie rods, reinforcing steel for concrete or the like in the solid substrates using this mortar composition.

21 Claims, No Drawings

MORTAR COMPOSITION OF AT LEAST TWO COMPONENTS AND CURABLE BY HEAT INITIATION AND A METHOD FOR FASTENING TIE RODS, REINFORCING STEEL FOR CONCRETE OR THE LIKE IN SOLID SUBSTRATES

FIELD OF INVENTION

The object of the present invention is a mortar composition of at least two components curable by heat initiation, containing at least one polymerizable monomer and/or at least one curable resin, at least one polymerization initiator for the polymerizable monomer and/or the curable resin and, optionally, at least one filler, as well as a method for fastening tie rods, reinforcing steel for concrete or the like in solid substrates using this mortar composition.

BACKGROUND INFORMATION AND PRIOR ART

Normally, two-component mortar compositions, based on methacrylates or epoxide resins, are used to fasten tie bars, reinforcing steel for concrete or similar elements in a borehole in mineral substrates. These mortar compositions, after their constituents, which react with on another, are mixed, have a certain pot life, during which the element, which is to be fastened, can be set and, at the end of a further time span, reach their ultimate strength. Under ordinary conditions, said pot life is of the order of a few minutes. The curing usually takes place within a few minutes to a few hours. In any case, the two effects are coupled to one another, that is, a longer pot life leads to a longer curing time. Furthermore, these times may vary, depending on the conditions of the surroundings, especially on the temperature.

In order to overcome this temperature dependence, the older German patent application 100 02 367.3 proposes a mortar composition, which can be cured by frontal polymerization after thermal initiation and which contains, aside from a polymerizable monomer or curable resin and, optionally, at least one filler, a polymerization initiator for the monomer, which can be activated at a temperature above 30° C., and/or a polymerization initiator for the monomer, which can be released thermally, and/or a curing accelerator for the curable resin. The nature and amount of monomers or resin and polymerization initiator or curing accelerator are selected so that, after the polymerization is initiated, the polymerization front has a speed of at least 10 cm/min (frontal speed).

U.S. Pat. No. 6,057,406 discloses that, for the frontal polymerization of a monomer mixture, tricaprylmethylammonium-persalfate an initiator can be used which has the advantage that gases are not formed during the decomposition. However, this very reactive polymerization initiator leads to an initiation of the polymerization already during the storage of a mixture of the initiator with polymerizable monomers.

Moreover, there is basically, that is, for frontal polymerization as well as for other methods of thermally initiated, free radical polymerization, a contradiction between the shelf life of the material to be used and the necessary high reactivity of the composition. For this reason, it is customary to formulate mortar constituents in two components and to combine either a less reactive initiator in one component with an accelerator in the second component or to store the active initiator in an inert substance (usually a plasticizer) separately from the polymerizable monomer or resin.

The amount of plasticizer used must be kept low, as it affects the mechanical properties of the cured mortar. This leads to mixing ratios of 1:10 to 1:7, which are disadvantageous for homogeneous mixing. For this reason, different procedures were proposed for using reactive carrier substances, which, in turn, make special reactants necessary in the other component.

Accordingly, the use of water as carrier substance has already been proposed. On the other hand, the WO-A-94/19397 discloses the use of epoxide and/or isocyanates as carrier material.

OBJECT OF THE INVENTION

However, since such carrier materials are expensive and disadvantageous, because reactions with the other components of the mortar composition may result, it is an object of the present invention to indicate a mortar composition, which can be cured by thermal initiation, does not require any additional carrier materials for the polymerization initiator, solves the problem of the homogeneous mixing and, while having a good shelf life, has a high reactivity and leads to homogeneously cured end products of high mechanical strength.

SUMMARY OF THE INVENTION

Thermal initiation is understood to mean that the polymerization reaction of the mortar composition, obtained by mixing the constituents present in the separate components, can be initiated at any time after the mixture is formed, by supplying heat so that the pot life of the mortar composition is very long and the curing can be started selectively at any time. By these means, it becomes possible initially to charge a large number of boreholes with the mortar composition, subsequently to insert and adjust the fastening elements and then to initiate the curing, so that it becomes possible to achieve an optimum and largely identical curing and, with that, largely identical pull-out strengths for the installed fastening elements.

Surprisingly, it has now turned out that it is possible to accomplish this objective in a very simple and elegant manner owing to the fact that, as polymerization initiator, an organically substituted ammonium persulfate is used, which, however, is present only in the form of the required starting materials in separate components of the mortar composition and is formed only in the mortar composition when the at least two components are mixed in situ. In this connection, one component of the mortar composition contains at least one organically substituted ammonium salt, while a different component contains at least one inorganic persulfate, which forms the organically substituted ammonium persulfate by a very rapid reaction, which is then available as initiator for the free radical curing of the mortar composition.

An object of the invention therefore is an at least two-component mortar composition of claim 1, which can be cured by thermal initiation The dependent claims relate to the preferred embodiments of this object, as well as to a method for fastening elements, such as tie rods, reinforcing steel for concrete or the like in solid substrates using this mortar composition.

The invention therefore relates to an at least two-component mortar composition, which can be cured by thermal initiation and contains a) at least one polymerizable monomer and/or at least one curable resin, b) at least one polymerization initiator for the polymerizable monomer and/or the curable resin and c) optionally at least one filler, wherein, as polymerization initiator, at least one organically substituted ammonium salt is contained as constituent of a mortar component and at least one inorganic persulfate is contained as constituent of a further mortar component, which, after the mortar components are mixed in situ, results in an organically substituted ammonium persulfate, the nature and amount of the organically substituted ammonium salt and inorganic persulfate as well as of polymerizable monomer or curable resin being selected in such a manner, that a mortar composition results, which can be polymerized by free radical polymerization due to the action of heat.

In accordance with a preferred embodiment of the invention, the mortar composition contains a) 10 to 98% by weight of at least one compound (A), which has at least one polymerizable vinyl group, as polymerizable monomer or curable resin,
b) 1 to 15% by weight of at least one organically substituted ammonium salt (B)
c) 1 to 15% by weight of at least one inorganic persulfate (C)
d) 0 to 60% by weight of at least one filler (D)
e) 0 to 10% by weight of at least one thickening agent (E)
f) 0 to 30% by weight of at least one further polymerization initiator (F), which can be activated thermally and/or released thermally at a temperature above 30° C. and has a self-acceleration decomposition temperature (SADT) of at least 30° C., for the vinyl compound (A)
g) 0 to 10% by weight of at least one polymerization accelerator (G) and
h) 0 to 10% by weight of at least one solvent or diluent (H), the organically substituted ammonium salt (B) and the inorganic persulfate (C) being present in components, which are hermetically separated from one another.

The polymerizable monomers or curable resins, which are used pursuant to the invention, are preferably selected from: acrylic acid, methacrylic acid, styrene, divinylbenzene, vinyl acetate, acrylamide, transition metal nitrate/acrylamide complexes, acrylates such as butyl actrylate, 2-(2-ethoxyethoxy)ethyl acrylate (EOEOEA), tetrahydrofurfuryl acrylate (THFA), lauryl acrylate, phenoxyethyl acrylate, isodecyl acrylate, tridecyl acrylate, ethoxylated nonylphenol acrylate, isobornyl acrylate (IBOA), ethoxylated bisphenol A diacrylate, polyethylene glycol diacrylate (PEGDA), alkoxylated diacrylate, propoxylated neopentyl glycol diacrylate (NPGPODA), 1,6-dihydroxyhexane diacrylate (HDDA), tetraethylene glycol diacrylate (TTEGDA), triethylene glycol diacrylate (TIEGDA), tripropylene glycol diacrylate (TPGDA), dipropolyene glycol diacrylate (DPGDA), ditrimethylolpropane tetraacetate (DITMP TTA), tris-(2-hydroxyethyl)-isocyanurate triacrylate (THEIC-TA), dipentaerythritol pentaacrylate (DIPEPA), ethoxylated trimethylolpropane triacrylate (TMPEOTA), propoxylated trimethylolpropane triacrylate (TMPPOTA), ethoxylated pentaerythritol tetraacrylate (PPTTA), propoxylated glycerol triacrylate (GPTA), pentaerythitol tetraacrylate (PETTA), trimethylolpropane triacrylate (TMPTA) and modified pentaerythritol triacrylate, methacrylates such as allyl methacrylate (AMA), tetrahydrofurfuryl methacrylate (THFMA), phenoxyethyl methacrylate, isobornyl methacrylate, methyl methacrylate (MMA), triethylene glycol dimethacrylate (TIEGDMA), ethylene glycol dimethacrylate (EGDMA), tetraethylene glycol dimethacrylate (TTEGDMA), polyethylene glycol dimethacrylate (PEGDMA), dihydroxybutane dimethacrylate (BDDMA), diethylene glycol dimethacrylate (DEGDMA), dihydroxyhexane dimethacrylate (HDDMA), polyethylene glycol dimethacrylate (PEG600DMA), butylene glycol dimethacrylate (BGDMA), ethoxylated bisphenol A dimethacrylate, trimethylolpropane trimethacrylate (TMPTMA); and/or oligomers or prepolymers, such as bisphenol A epoxyacrylate, epoxidized soybean oil acrylate, epoxy-novolak acrylate oligomers, bisphenol A epoxyacrylate, modified with fatty acids, aromatic monoacrylate oligomers, aliphatic diacrylate oligomer, tetrafunctional epoxy acrylate, amine-modified polyether acrylate oligomer, aliphatic urethane triacrylate, aliphatic urethane tetraacrylate, aliphatic urethane diacrylate, hexafunctional, aromatic urethane acrylate, aromatic urethane diacrylate, aromatic urethane tetraacrylate and tetrafunctional polyester acrylate In accordance with a specially preferred embodiment of the invention, the mortar composition contains, as compound (A) having at least one polymerizable vinyl group, acrylic acid, methacrylic acid, an acrylate ester, such as n-butyl acrylate, 1,6-dihydroxyhexane diacrylate, trimethylolpropane triacrylate or pentaerythritol tetraacrylate, a methacrylate ester, such as methyl methacrylate, triethylene glycol dimethacrylate, diethylene glycol dimethacrylate, triethylene glycol dimethacrylate or trimethylolpropane trimethacrylate, styrenel divinylbenzene, vinyl acetate, acrylamide, a transition metal nitrate/acrylamide complex, an oligomeric, aliphatic urethane (meth)acrylate, epoxy (meth)acrylate, polyether (meth)acrylate and/or polyester (meth)acrylate.

Furthermore, the use of a tri- or, in particular, a tetraalkyl-, -aryl or -arylalkylammonium salt, for example, a halide such as a chloride, acetate, (meth)acrylate and/or hydrogen sulfate, is preferred. The use of tetrabutylammonium chloride, benzyltriethylammonium chloride, tetrabutylammonium hydrogen sulfate, tetradecyldimethylbenzylammonium chloride or trimethylcaprylammonium chloride or mixtures of these compounds is especially preferred.

As inorganic persulfate (C), preferably sodium, potassium, unsubstituted or weakly substituted ammonium persulfate, such as mono- or dialkyl- -aryl and/or -arylalkyl ammonium persulfate is used.

Preferably, as filler (D), the mortar composition described contains quartz sand, powdered quartz, pyrogenic silica, corundum, small glass beads, a carbonate, a sulfate, cement, a metal powder or granulate, a hydrated phyllosilicate, such as montmorillonite, hectorite and bentonite, an organic filler and/or mixtures thereof.

As thickening agent (E), preferably silica and/or a silicate, such as laponite or bentonite is used.

According to a further, preferred embodiment of the invention, it is possible to add to the mortar composition, as an additional polymerization initiator (F) for improving the curing, a peroxide, especially a dialkyl peroxide, such as di-t-butyl peroxide, a diacyl peroxide, such as dibenzoyl peroxide, a hydroperoxide such as t-butyl hydroperoxide or cumene hydroperoxide, a percarboxylate, such as butyl perbenzoate, a perketal such as 1,1-di-t-butyl-peroxy-3,3,5-trimethylcyclohexane, and/or an azo compound, such as azobisisobutyronitrile, with a self-acceleration decomposition temperature (SADT) of at least 30° C. and preferably of 55° to 120° C.

Moreover, if a polymerization accelerator (G) is used, it is preferably one, which can be activated thermally and/or set free thermally at a temperature above 30° C. and preferably at a temperature ranging from 50° to 120° C. In particular, such an accelerator is an amine, preferably a tertiary amine, such as dimethylanaline and/or a metal compound, such as a cobalt or vanadium compound Moreover, for adjusting the viscosity it is possible to incorporate additionally an inert solvent and/or diluent (L), such as a plasticizer, particularly a dialkyl phthalate or dialkyl adipate, and/or dimethylformamide.

A further object of the present invention is a method for fastening elements, such as tie rods and reinforcing steel for concrete or the like in solid substrates, wherein the above-defined mortar composition is introduced into the dowel hole, the tie rod, the reinforcing steel or the like is inserted in the hole and the curing is initiated by heating the mortar composition.

In this case, the components of the mortar composition can be mixed, for example, by a static mixer. As a result, the organically substituted ammonium salt of the one mortar component can react spontaneously in situ with the inorganic persulfate of the at least one further mortar components to form the corresponding, organically substituted ammonium persulfate, so that a mortar composition, which can be polymerized by a free radical reaction by the action of heat, is formed. This mortar composition is then brought into the dowel hole, which was previously provided in the solid substrate, in which the fastening element is to be fastened. Subsequently, the tie rod, the reinforcing steel for concrete or a similar fastening element is introduced into the dowel hole, which has been charged with mortar composition, whereupon the curing of the mortar composition by heating it to a temperature above the reaction temperature of the persulfate and optionally of the additional polymerization initiator and/or polymerization accelerator is initiated.

The thermal initiation can be brought about by the pointwise or two-dimensional heating of the surface layer of the mortar composition or by supplying heat to the interior of the mortar composition. Moreover, it is possible to bring about the thermal initiation of the mortar composition by supplying heat over a heat-conducting fastening element by conduction or resistance heating or with the help of an energy field, such as an electric, magnetic or electromagnetic field, which is irradiated over the fastening element, for example, by microwave radiation.

For carrying out the inventive method, the dimensions of the borehole and the tie rod are selected in accordance with the state of the art for injection systems. The amount of inventive mortar composition, which is introduced into the prepared borehole, is such that the annular gap is filled completely, after the element, which is to be fastened, has been set. Pursuant to the invention, an adjustment of the element is possible, since the mortar composition is cured only after it has been heated briefly, for a few seconds, to at least 80° C.

In this manner, it becomes possible to introduce a large number of fastening elements into previously prepared dowel holes, which have already been filled with mortar composition, and, after all fastening elements have been fastened and aligned, to bring about the curing of the mortar composition rapidly and completely by the mentioned heat initiation and, above all, uniformly and, with that, to achieve a high uniformity and constancy of the strength of the set fastening elements.

DETAILED DESCRIPTION OF THE PREFERRED EMBODIMENT

EXAMPLE 1

Composition cured by frontal polymerization; components A and B are mixed in a ratio of 1:1

|  | Total | Component A | Component B |
| --- | --- | --- | --- |
| Pentaerythritol tetracrylate (SR 295) | 86 | 45 | 41 |
| Modified silica (Cab-O-Sil) | 2 | 1 | 1 |
| Ammonium persulfate | 8 | 0 | 8 |
| Tetrabutylammonium chloride | 4 | 4 | 0 |
|  | 100 | 50 | 50 |

Initially, components A and B were prepared separately using the constituents given in the above Table After the two components are mixed with the help of a static mixer, a mortar composition is obtained, which can be polymerized by a free radical mechanism, since the ammonium persulfate reacts spontaneously with the tetrabutylammonium chloride, forming tetrabutylammonium persulfate. After removal from the static mixer, the mortar composition obtained is filled into the borehole in the concrete of quality C20 with a borehole depth of 130 mm and a borehole diameter of 14 mm. After the insertion of a tie rod with an external diameter of 12 mm and the initiation of the polymerization by heating the mortar composition in the top of the borehole with the help of a soldering iron to a temperature of 150° C., there is complete curing of the composition within a period of 30 seconds. The pull-out force of the tie rod after curing is about 29 5 kN.

EXAMPLE 2

Composition cured by frontal polymerization; components A and B are mixed in a ratio of 1:1

|  | Total | Component A | Component B |
| --- | --- | --- | --- |
| Pentaerythritol tetracrylate (SR 295) | 66.25 | 33.75 | 32.5 |
| Modified silica (Cab-O-Sil) | 2.75 | 1.75 | 1 |
| Quartz sand | 15 | 7.5 | 7.5 |
| Dimethylformamide | 3 | 3 | 0 |
| Peroxide (DHBP (45%) Trigenox 101) | 1 | 0 | 1 |
| Ammonium persulfate | 8 | 0 | 8 |
| Tetrabutylammonium chloride | 4 | 4 | 0 |
|  | 100 | 50 | 50 |

Initially, components A and B were prepared separately using the constituents given in the above Table.

After the two components of the mortar composition are mixed, the latter is introduced into a concrete borehole in the manner described in Example 1 for fastening a tie rod. After curing, the pull-out force of the tie rod is 39 kN.

What is claimed is:

1. An at least two-component mortar composition, which can be cured by thermal initiation and contains
    a) at least one polymerizable monomer and/or at least one curable resin,
    b) at least one polymerization initiator for the polymerizable monomer and/or the curable resins, and
    wherein, as a starting materials for a polymerization initiator, at least one organically substituted ammonium salt is contained as constituent of a mortar component and at least one inorganic persulfate is contained as constituent of a further mortar component, and which, after the mortar components are mixed in situ, results in an organically substituted ammonium persulfate, the nature and amount of the organically substituted ammonium salt and inorganic persulfate as well as of polymerizable monomer or curable resin being selected in such a manner, that a mortar composition results, which can be polymerized by free radical polymerization due to the action of heat.

2. The mortar composition of claim 1, wherein the composition contains
   a) 10 to 98% by weight of at least one compound (A), which has at least one polymerizable vinyl group, as polymerizable monomer or curable resin,
   b) 1 to 15% by weight of at least one organically substituted ammonium salt (B)
   c) 1 to 15% by weight of at least one inorganic persulfate (C)
   d) 0 to 60% by weight of at least one filler (D)
   e) 0 to 10% by weight of at least one thickening agent (E)
   f) 0 to 30% by weight of at least one further polymerization initiator (F), which can be activated thermally and/or released thermally at a temperature above 30° C. and has a self-acceleration decomposition temperature (SADT) of at least 30° C., for the vinyl compound (A)
   g) 0 to 10% by weight of at least one polymerization accelerator (G) and
   h) 0 to 10% by weight of at least one solvent or diluent (H), the organically substituted ammonium salt (B) and the inorganic persulfate (C) being present in components, which are hermetically separated from one another.

3. The mortar composition of claim 2, wherein the composition contains, as polymerizable vinyl compound (A), acrylic acid, methacrylic acid, an acrylate ester, a methacrylate ester, styrene, divinylbenzene, vinyl acetate, acrylamide, a transition metal nitrate/acrylamide complex, an oligomeric, aliphatic urethane (meth) acrylate, epoxy (meth)acrylate, polyether (meth)acrylate and/or polyester (meth)acrylate.

4. The mortar composition of claim 1, wherein the composition contains, as organically substituted ammonium salt (B), a tri- or tetraalkl/, -aryl or arylalkylammonium halide, acetate (hydrogen) phosphate, (hydrogen) sulfate, and (meth)acrylate.

5. The mortar composition of claim 1 wherein ammonium, potassium or sodium persulfate or mixtures of these materials are contained as inorganic persulfate (C).

6. The mortar composition of claim 1, wherein quartz sand, powdered quartz, pyrogenic silica, corundum, small glass beads, a carbonate, a sulfate, cement, a metal powder or granulate, a hydrated phyllosilicate, such as montmorillonite, hectonte and bentonite, an organic filler and/or mixtures thereof are contained as filler (D).

7. The mortar composition of claim 2, wherein silica and/or a silicate, such as laponite or bentonite are contained as thickening agent (E).

8. The mortar composition of claim 2, wherein a peroxide, a diacyl peroxide, a hydroperoxide, a perketal, and/or an azo compound, with a self-acceleration decomposition temperature (SADT) of at least 30° C. and preferably of 55° to 80° C., is contained as additional polymerization initiator (F).

9. The mortar composition of claim 2, wherein an amine, a sulfide, a thiourea or a mercaptan and/or a metal compound, is contained as polymerization accelerator (G).

10. The mortar composition of claim 2, wherein a plasticizer, water and/or dimethylformamide is contained as inert solvent (H).

11. A method of fastening tie bars, reinforcing steel for concrete having a dowel hole, the method comprising the steps of bring into the dowel hole an at least two-component mortar composition which can be cured by thermal initiation and contains
   a) at least one polymerizable monomer and/or at least one curable resin,
   b) at least one polymerization initiator for the polymerizable monomer and/or the curable resin, wherein, as starting materials for a polymerization initiator, at least one organically substituted ammonium salt is contained as constituent of a further mortar component, and which, after the mortar components are mixed in situ, results in an organically substituted ammonium persulfate, the nature and amount of the organically substituted ainmonium salt and inorganic persulfate as well as of polymerizable monomer or curable resin being selected in such a manner, that a mortar composition results, which can be polymerized by free radical polymerization due to the action of heat; introducing a tie bar or reinforcing steel into the dowel hole; and initiating curing by heating the mortar composition.

12. The method of claim 11, wherein the heating of the mortar composition is initiated by supplying energy by way of the fastening element.

13. The method of claim 11, wherein the heat is introduced by resistance heating and/or an electric, magnetic or electromagnetic field.

14. The mortar composition of claim 1, further containing at least one filler.

15. The mortar composition of claim 3, wherein an acrylate ester is selected from a group containing n-butyl acrylate, 1,6-dihydroxyhexane diacrylate, trimethylolpropane triacrylate or pentaerythritol tetraacrylate, and a methacrylate ester is selected from a group containing methyl methacrylate, dihydroxybutane dimethacrylate, triethylene glycol dimethacrylate, diethylene glycol dimethacrylate, triethylene glycol dimethacrylate or trimethylolpropane trimethacrylate.

16. The mortar composition of claim 4, wherein the composition contains tetrabutylammonium chloride, benzyltriethylammonium chloride, tetrabutylammonium hydrogen sulfate, tetradecyldimethylbenzylammonium chloride or trimethylcaprylammonium chloride or mixtures of these compounds.

17. The mortar composition of claim 8, wherein the composition contains a dialkyl peroxide as the peroxide, a dibenzoyl peroxide as the diacyl peroxide, t-butyl hydroperoxide or cumene hydroperoxide as the hydroperoxide, butyl perbenzoate as the percarboxylate, 1,1-di-t-butylperoxy-3,3,5-trimethylcyclohexane as a perketal, and/or azobisisobutyronitrile as an azo compound.

18. A mortar composition of claim 17, wherein the diacyl peroxide is a di-t-butyl peroxide.

19. A mortar composition of claim 9, wherein a tertiary amine is selected as the amine, and a cobalt compound is selected as the metal compound.

20. A mortar composition of claim 19, wherein the tertiary amine is dimethylamine.

21. A mortar composition of claim 10, wherein the plasticizer is selected from a group containing dialkyl phthalate and a dialkyl adipate.

* * * * *